(12) United States Patent
Takahashi et al.

(10) Patent No.: US 6,357,663 B1
(45) Date of Patent: Mar. 19, 2002

(54) FINGERPRINT IDENTIFYING PC CARD

(75) Inventors: Kimiyo Takahashi, Iiyama; Satoshi Sakurai; Nobuo Yatsu, both of Tokyo, all of (JP)

(73) Assignee: Fujitsu Takamisawa Component Limited, Tokyo (JP)

(*) Notice: Subject to any disclaimer, the term of this patent is extended or adjusted under 35 U.S.C. 154(b) by 0 days.

(21) Appl. No.: 09/337,738

(22) Filed: Jun. 22, 1999

(30) Foreign Application Priority Data

Jul. 30, 1998 (JP) .......................................... 10-216074
Nov. 5, 1998 (JP) .......................................... 10-314691

(51) Int. Cl.⁷ ................................................. G06K 7/00
(52) U.S. Cl. ............. 235/486; 235/463.43; 235/462.45; 902/3
(58) Field of Search ........................... 235/486, 472.01, 235/462.45, 462.43; 902/3, 5; 361/684, 724–726

(56) References Cited

U.S. PATENT DOCUMENTS

| | | | | |
|---|---|---|---|---|
| 4,210,899 A | * | 7/1980 | Swonger | 340/146 |
| 5,473,144 A | * | 12/1995 | Mathurin, Jr. | 235/380 |
| 5,533,125 A | * | 7/1996 | Bensimon et al. | 380/4 |
| 5,793,607 A | * | 8/1998 | Karidis et al. | 361/684 |
| 5,869,822 A | * | 2/1999 | Meadows, II et al. | 235/380 |
| 5,987,155 A | * | 11/1999 | Dunn et al. | 235/382 |
| 6,088,229 A | * | 7/2000 | Seto et al. | 361/726 |
| 6,111,977 A | * | 8/2000 | Scott et al. | 382/124 |
| 6,148,094 A | * | 11/2000 | Kinsella | 382/124 |

FOREIGN PATENT DOCUMENTS

| | | | | |
|---|---|---|---|---|
| EP | 0924657 | * | 6/1999 | G07C/9/00 |
| JP | 0196691 | * | 9/1989 | 902/3 |
| JP | 2-194485 | | 8/1990 | |

* cited by examiner

Primary Examiner—Michael G. Lee
Assistant Examiner—Daniel St. Cyr
(74) Attorney, Agent, or Firm—Staas & Halsey LLP

(57) ABSTRACT

A portable apparatus having a slot for inserting a PC card which includes a card unit and a fingerprint scanner unit. The PC card has a support for supporting the scanner and reducing the force transferred to the card unit and a connector for realizing correct fingerprint identification whether the card is inserted into the left or the right of the apparatus. The apparatus includes a support pivotally joins the scan unit and the card unit together or adjust the height of the scan unit.

14 Claims, 19 Drawing Sheets

(A)

(B)

FINGERPRINT IDENTIFYING PC CARD

BACKGROUND OF THE INVENTION

1. Field of the Invention

The present invention relates to a PC card, and particularly, to a PC card having a fingerprint identifying function.

2. Description of the Related Art

Information available in electronic forms and open communication networks of these days enable anyone who has an information terminal such as a personal computer (PC) to access the information. It is important to strictly manage confidential corporate and private information.

Presently, passwords are widely used to identify persons accessing information terminals. The passwords, however, are imperfect because they are easy to steal.

To improve safety, a technique of using biometric characteristics and, in particular, fingerprints of persons who access information terminals is drawing attention.

Conventional fingerprint identifying devices are large, and therefore, cannot be carried with portable equipment such as notebook PCs.

The notebook PCs generally have slots for PC cards that provide various functions.

For example, a fax card can be inserted into a slot of a notebook PC to transfer documents from the PC by facsimile.

SUMMARY OF THE INVENTION

An object of the present invention is to provide a fingerprint identifying PC card to be inserted into a card slot of a notebook PC.

In order to accomplish the object, a first aspect of the present invention provides a fingerprint identifying PC card to be removably inserted into a card slot of a portable information apparatus, consisting of a card unit and a scan unit incorporating a scanner used for identifying a fingerprint.

The first aspect provides the scan unit on the card unit so that the PC card is easy to carry and easy to insert into a portable PC.

A second aspect of the present invention provides, further, a supporting part for supporting the scan unit to reduce the force transferred to the card unit when a finger is set on the scan unit.

The supporting part of the second aspect accepts a force applied to the scan unit by a finger, thereby preventing the force from directly affecting the card unit.

A third aspect of the present invention provides a finger sensor. The finger sensor is arranged at a finger inserting part of the scan unit in front of the scanner, for detecting the presence of a finger on the scan unit.

The finger sensor of the third aspect determines whether or not a finger is correctly placed on the scan unit.

A fourth aspect of the present invention provides a connector for connecting the card unit with the scan unit so that the finger sensor always comes to the side in front of the scanner whether the card unit is inserted into the left or right side of the information apparatus.

The fourth aspect connects the card unit with the scan unit so that the finger sensor always comes to the front of the scanner irrespective of the position of the card slot of the information apparatus.

DESCRIPTION OF THE PREFERRED EMBODIMENTS

Figure 1:
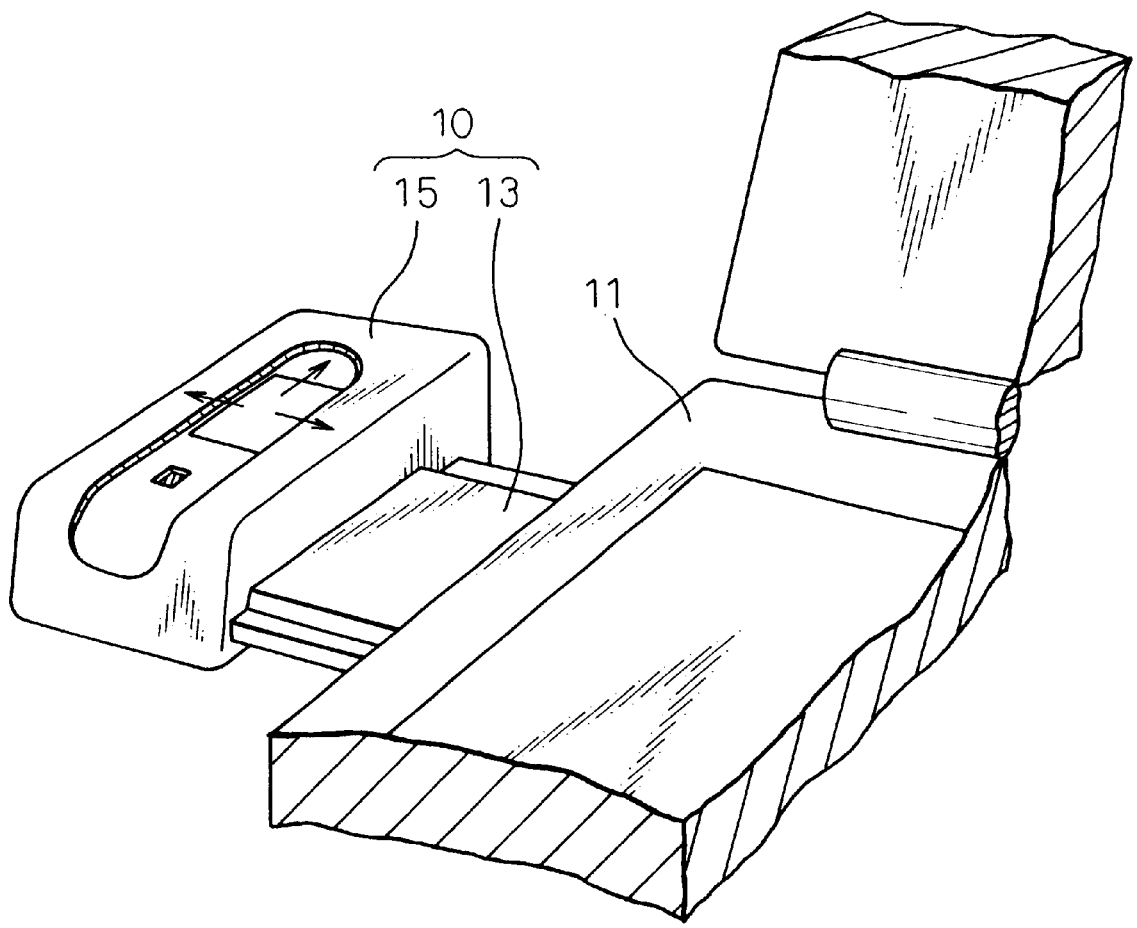
FIG. 1 is a perspective view showing a PC card according to a first embodiment of the present invention.
Figure 2:
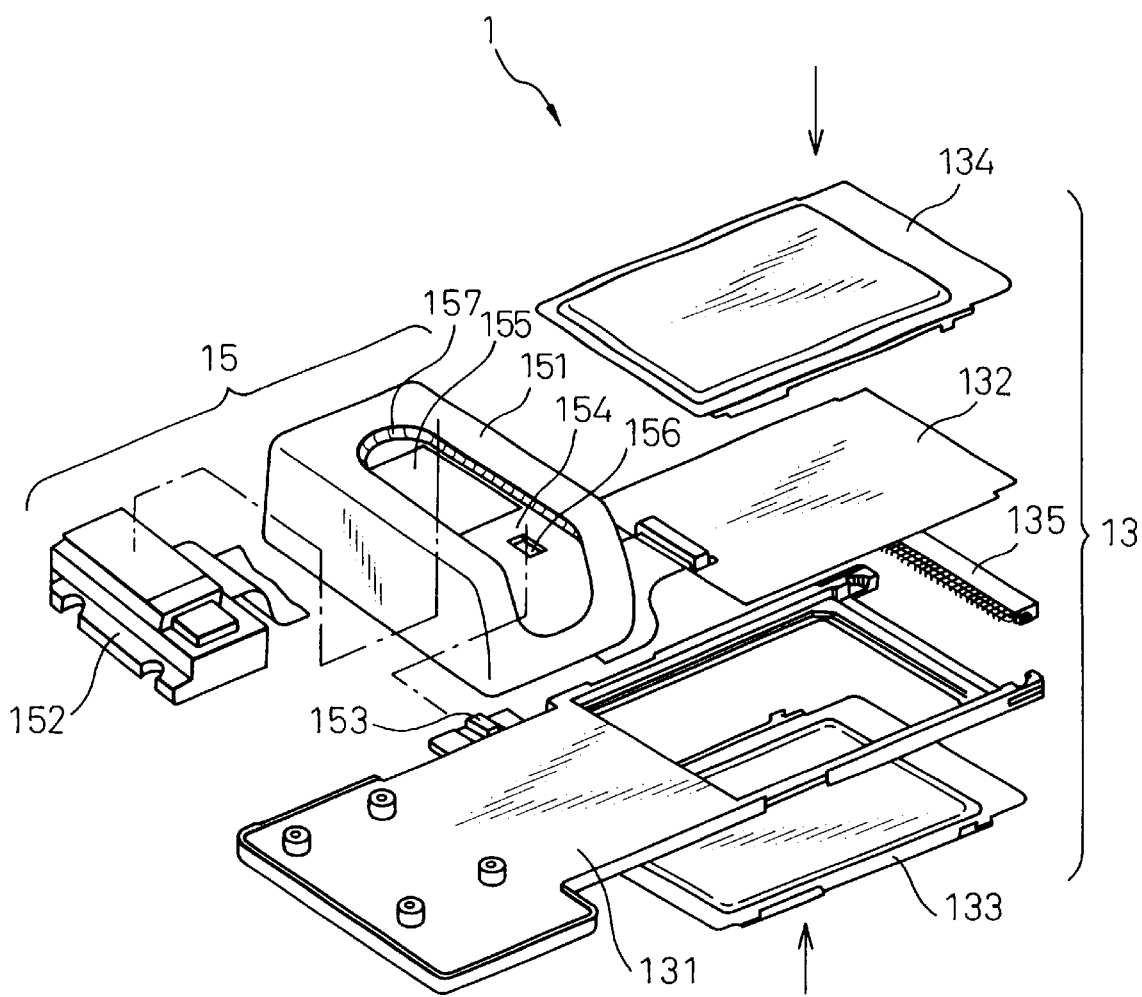
FIG. 2 is an exploded perspective view showing the PC card of FIG. 1.

FIG. 1 is a perspective view showing essential parts of a portable information apparatus such as a notebook PC and a PC card 10 according to the first embodiment of the present invention inserted into a side of the PC. FIG. 2 is an exploded perspective view showing the PC card 10.

The PC card 10 has a card unit 13 and a scan unit 15.

The card unit 13 includes a base frame 131 made of, for example, injection molded resin having an opening, a printed circuit board 132 arranged at the opening of the base frame 131, and covers 133 and 134 made of stainless steel for covering the top and bottom of the printed circuit board 132. A connector 135 for external connection is attached to the printed circuit board 132.

The scan unit 15 has a cover 151 fixed to an end of the base frame 131.

Inside the cover 151, there are a CCD scanner 152 and a finger sensor 153. The scanner 152 is electrically connected to the printed circuit board 132 through, for example, a flexible substrate (FPC).

A finger receiver 154 is formed by denting a middle part of the cover 151.

Figure 3:
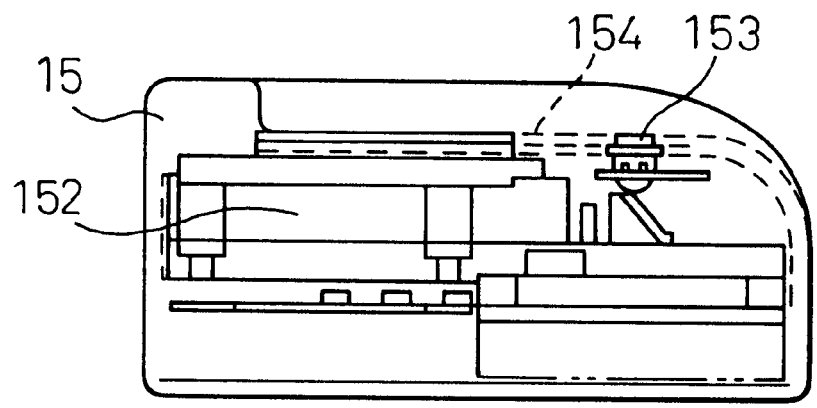
FIG. 3 is a sectional view showing a scan unit of the PC card of FIG. 1 seen from the side of a notebook PC into which the PC card is inserted.

As shown in FIG. 3, a rectangular opening 155 is formed at the bottom of the finger receiver 154. In the opening 155, a fingerprint detector of the scanner 152 is arranged. The finger receiver 154 has a small rectangular opening 156 in which the finger sensor 153 is arranged.

The finger sensor 153 is used to determine whether or not a finger is properly positioned with respect to the finger receiver 154. Namely, it determines whether or not the finger is horizontally tightly put on the finger receiver 154. If the finger is correctly set, the scanner 152 reads the fingerprint of the finger. This arrangement greatly improves fingerprint reading accuracy.

An output signal from the finger sensor 153 may be used to turn on and off a power source of the scanner 152 to reduce power consumption.

Figure 4:
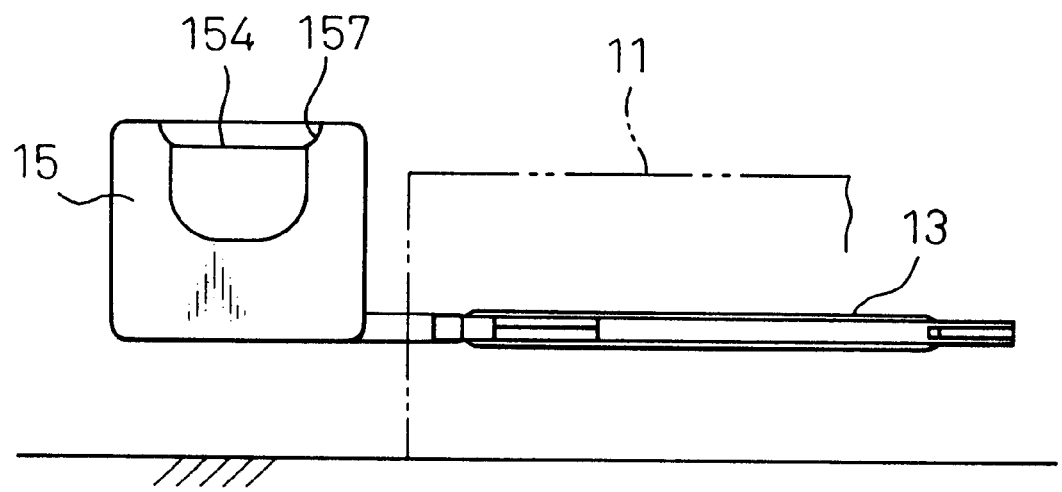
FIG. 4 is a side view showing the PC card of FIG. 1 seen from the front of the notebook PC.

As shown in FIG. 4, the top of the cover 151 and the finger receiver 154 are connected by a concave face 157 to restrict the horizontal, and vertical movements of a finger set on the finger receiver 154.

Two examples of the PC card according to the present invention will be explained with reference to FIGS. 5 and 6.

Figure 5:
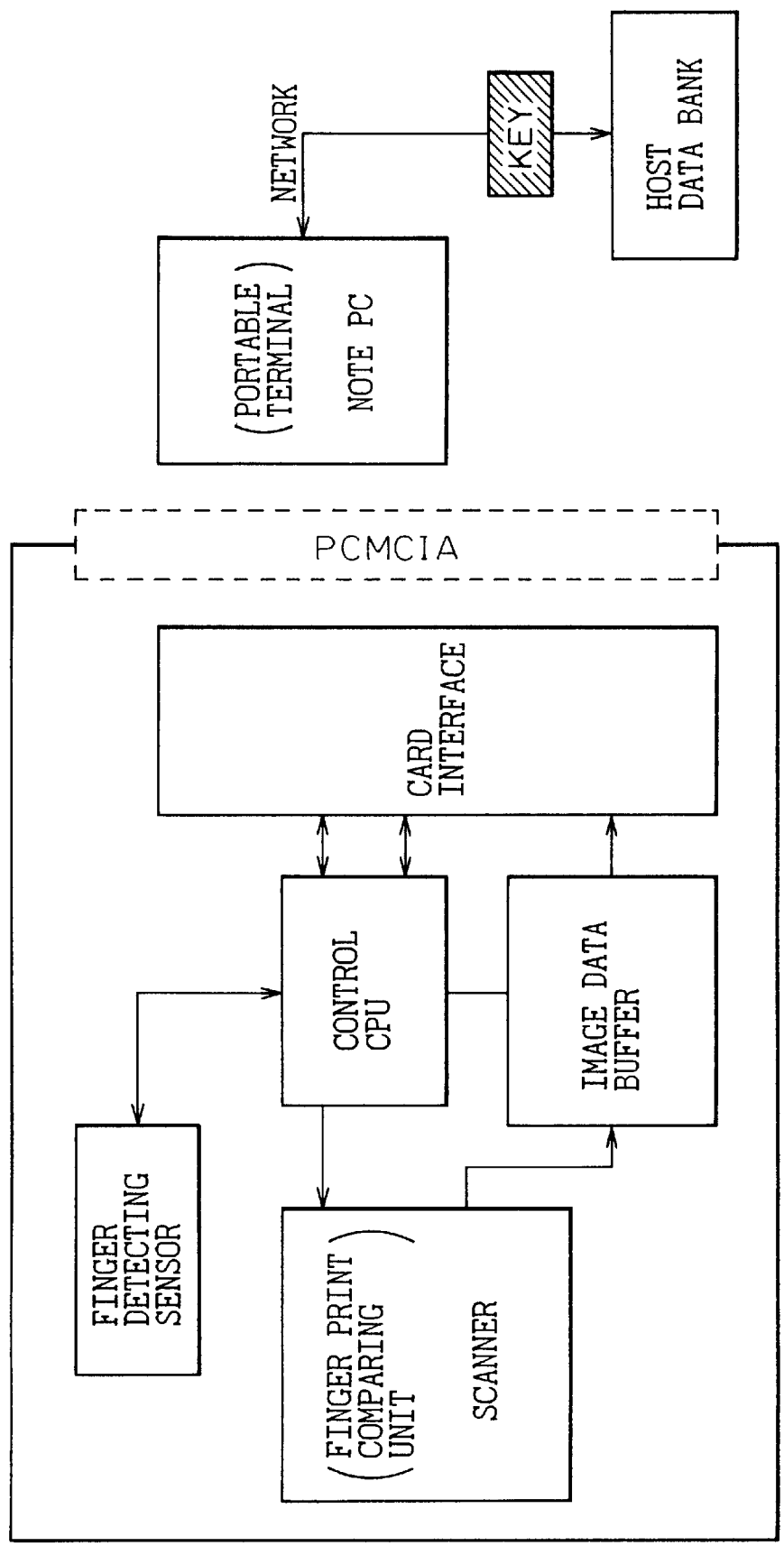
FIG. 5 is a block diagram showing an application of the PC card of the present invention.

The example of FIG. 5 relates to network security. The PC card of the present invention is used to prevent an unauthorized person from illegally invading a computer network. A fingerprint provided by the scanner 152 is compared with registered fingerprints to determine whether or not it is one of an authorized person. If it is one of an unauthorized person, connection is cut by software to prevent the person from invading into the network. This is equivalent to providing an exclusive key for each notebook PC serving as a terminal of the network to secure the safety and normal operation of the network.

Figure 6:
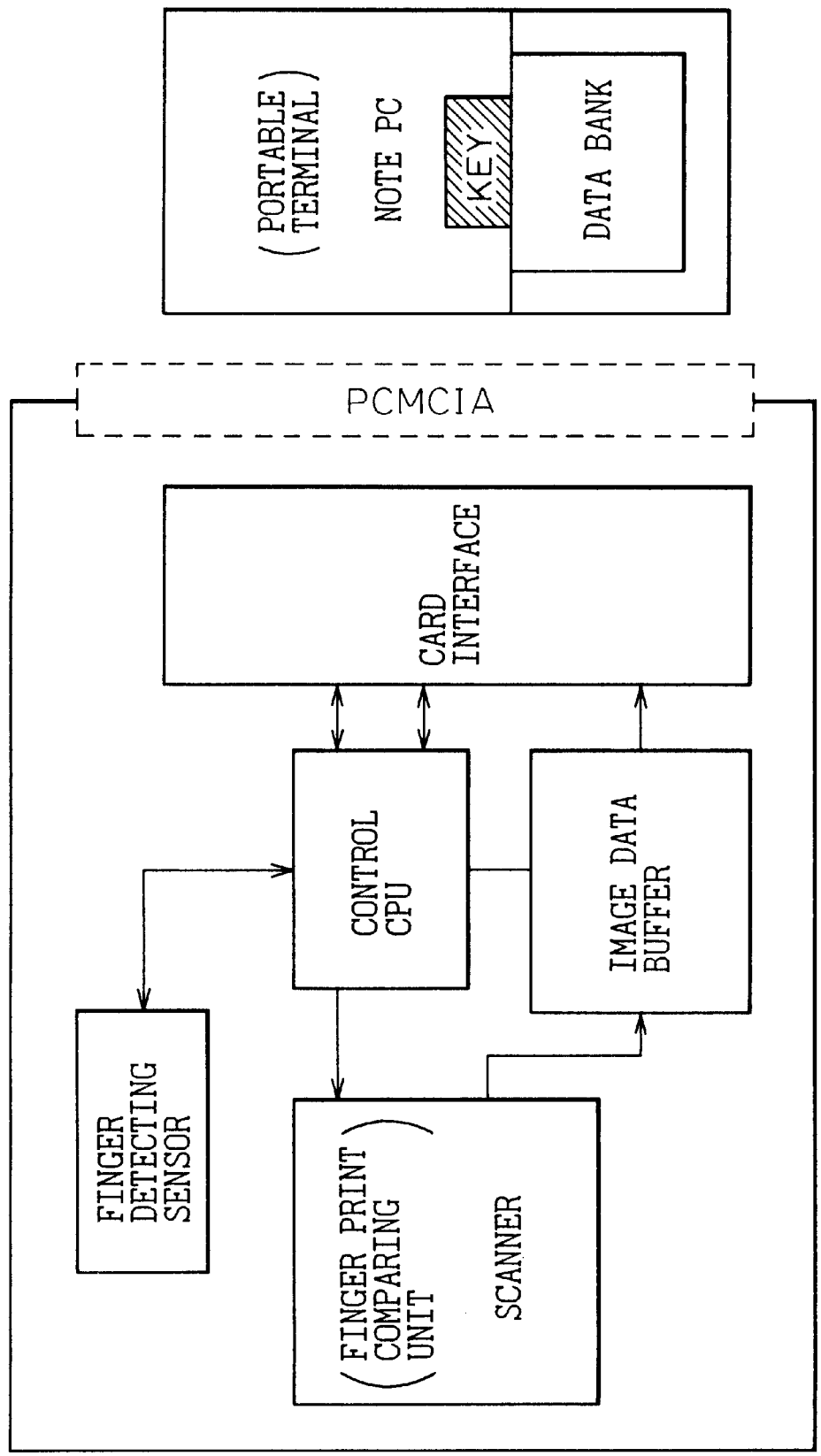
FIG. 6 is a block diagram showing another application of the PC card of the present invention.

The example of FIG. 6 relates to computer security. The PC card of the present invention is used to prevent an unauthorized person from illegally accessing data stored in a notebook PC. A fingerprint provided by the scanner 152 is compared with registered fingerprints to determine whether or not it is one of an authorized person. If it is one of an unauthorized person, the data is protected from illegel access by software. This is equivalent to providing an exclusive key for the notebook PC to surely prevent illegal operation on the notebook PC.

PC cards according to the embodiments of the present invention will be explained. In each embodiment, the same parts as those of the first embodiment are represented with the same reference marks to avoid repetitive explanation.

Figure 7:
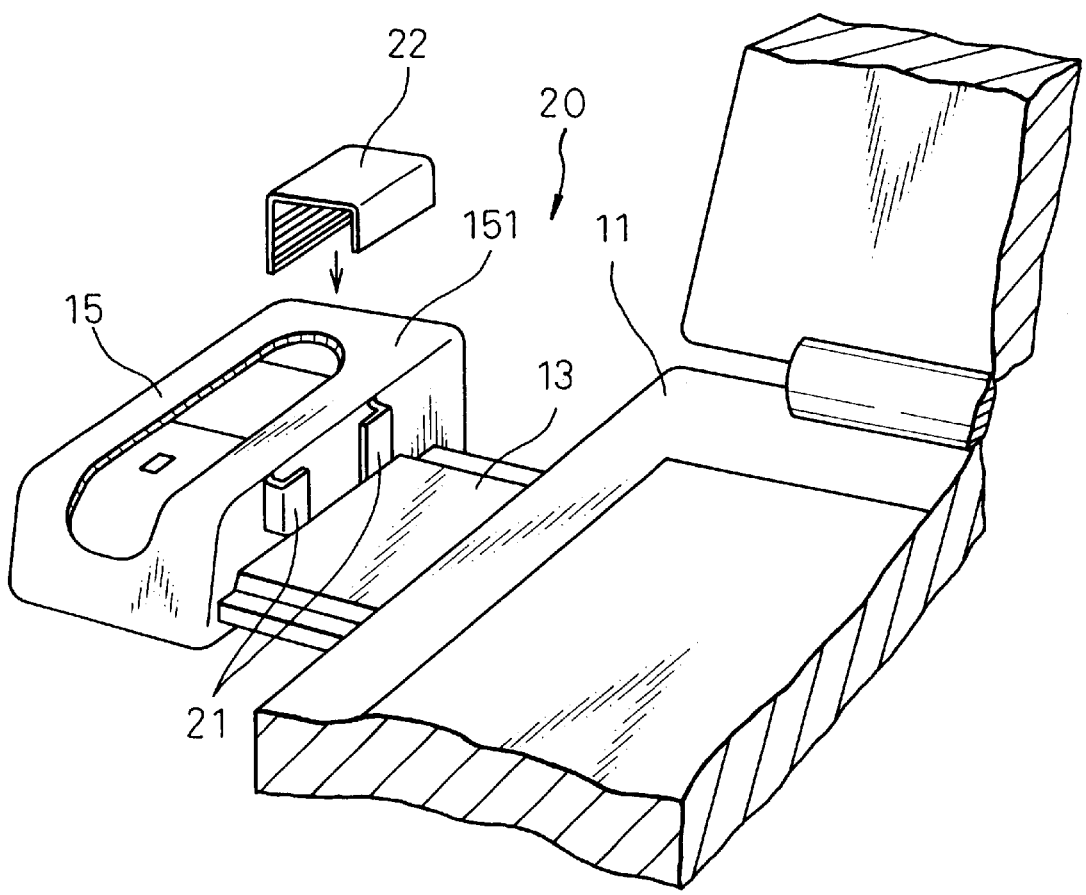
FIG. 7 is a perspective view showing a PC card according to a second embodiment of the present invention.
Figure 8:
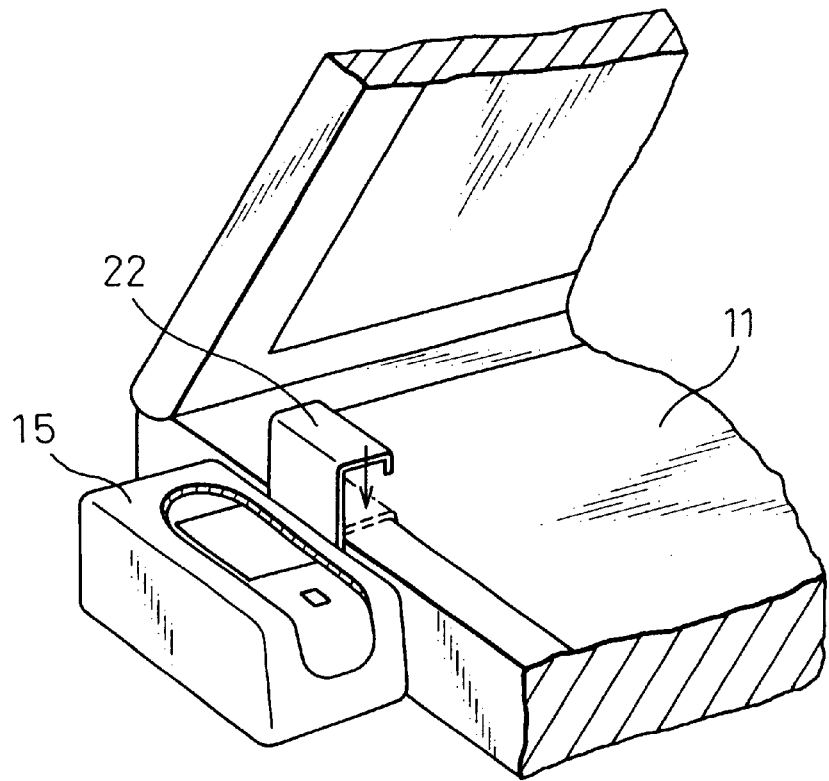
FIG. 8 is a perspective view showing the PC card of FIG. 7 seen from a different direction.

FIGS. 7 and 8 show a fingerprint identifying PC card 20 according to the second embodiment of the present invention. Compared with the first embodiment, the PC card 20 of the second embodiment additionally has L-shaped flanges 21 along a side face of a cover 151 of a scan unit 15. A C-shaped hook 22 made of resin or metal has an end fitted into the flanges 21 and another end hooked to a bezel of a notebook PC 11.

After the PC card 20 is inserted into a card slot of the PC 11, the hook 22 is hooked to the bezel of the PC 11 and is inserted into the flanges 21 so that the PC card 20 cannot escape from the card slot. When scanning the fingerprint of a finger, the hook 22 bears downward force applied by the finger to the scan unit 15, thereby reducing bending force acting on the PC card 20.

Figure 9:
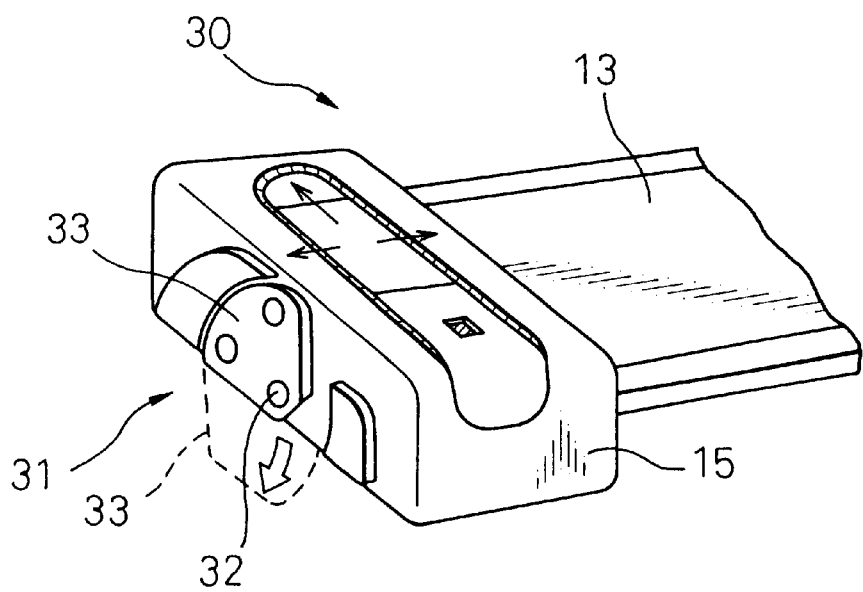
FIG. 9 is a perspective view showing a PC card according to a third embodiment of the present invention.
Figure 10:
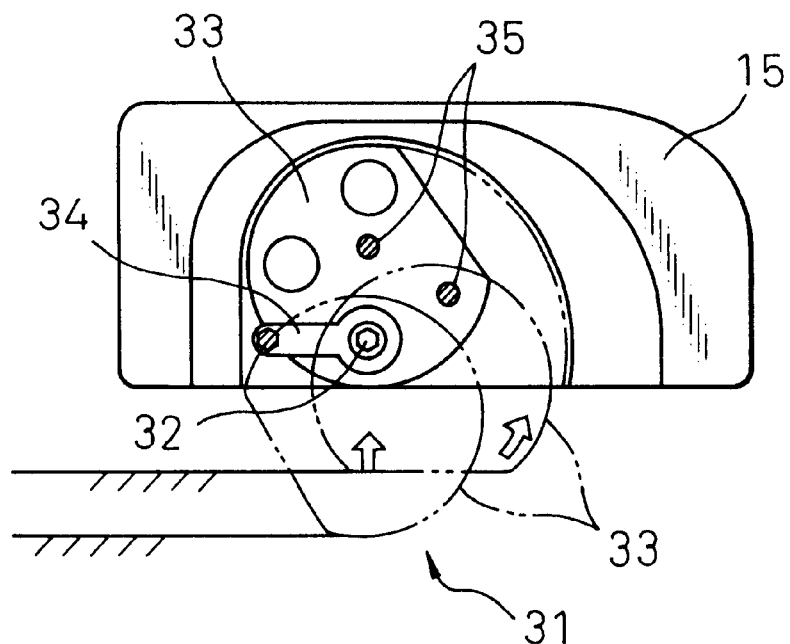
FIG. 10 is an explanatory view showing the movement of an eccentric disk serving as a leg of the PC card of FIG. 9.
Figure 11:
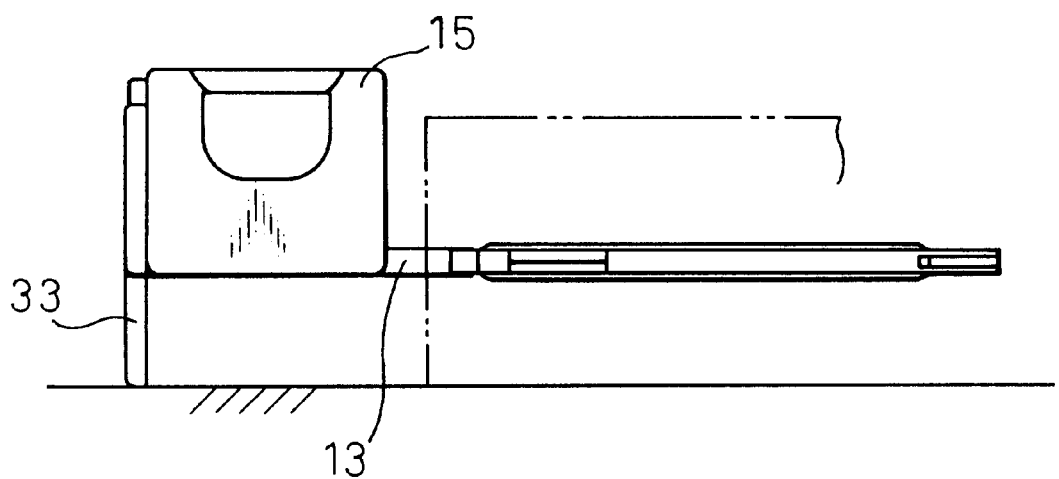
FIG. 11 is a side view showing the PC card of FIG. 9 seen from the front of a notebook PC into which the PC card is inserted.

FIGS. 9 to 11 show a fingerprint identifying PC card 30 according to the third embodiment of the present invention. Compared with the first embodiment, the third embodiment additionally has a height adjusting mechanism. Namely, it has an adjustable leg 31 on a side face of a scan unit 15. The height of the leg 31 is adjustable.

The leg 31 has a shaft 32 attached to the side face of the scan unit 15, a thin eccentric disk 33 that is rotatable around the shaft 32, and a click lever 34 rotating with the disk 33. Recesses 35 are formed on the side face of the scan unit 15 along a circle around the shaft 32, and a projection formed at a tip of the lever 34 engages with any one of the recesses 35.

The disk 33 is turned around the shaft 32, and the tip of the lever 34 resiliently engages with one of the recesses 35 so that the disk 33 may protrude by a predetermined distance from the bottom of the scan unit 15 and support the scan unit 15. This arrangement adjusts the height of the scan unit 15.

Even if downward force is applied to the scan unit 15 by a finger to be scanned, the leg 31 stably supports the scan unit 15 and prevents excessive bending force from being transferred to the PC card 30. Since the leg 31 has a simple structure, it involves little increase in the cost of the PC card 30.

Figure 12:
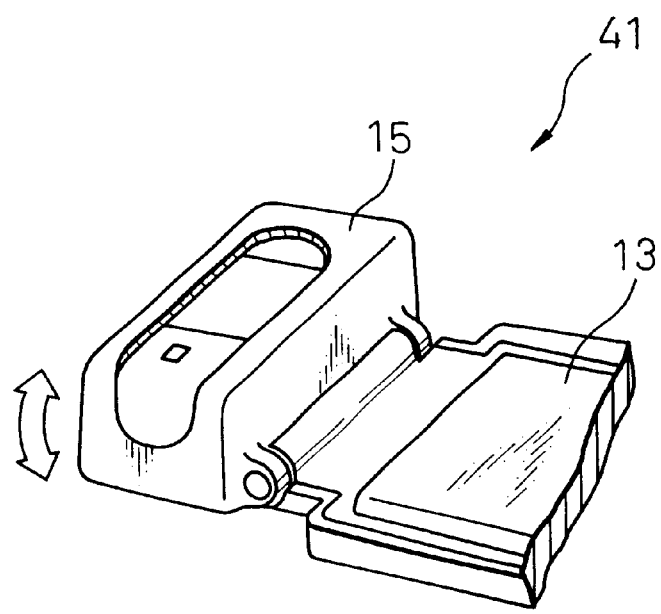
FIG. 12 is a perspective view showing a PC card according to a fourth embodiment of the present invention.
Figure 13:
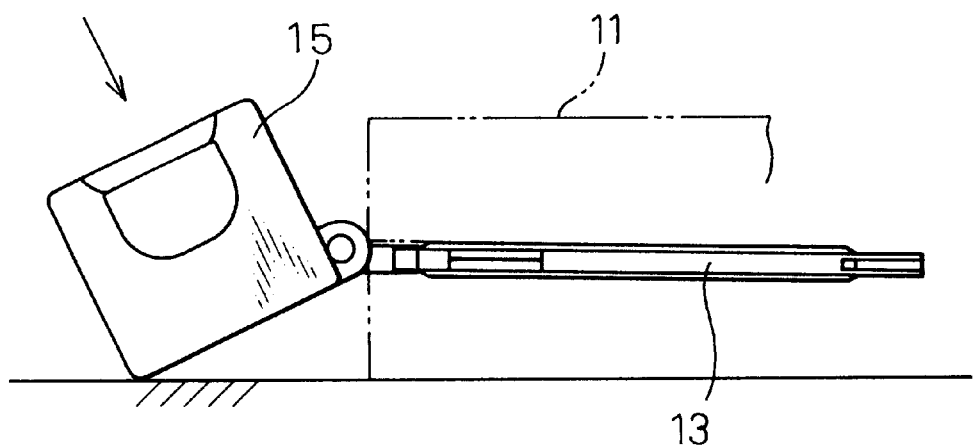
FIG. 13 is a side view showing the PC card of FIG. 12 seen from the front of a notebook PC into which the PC card is inserted.

FIGS. 12 and 13 show a fingerprint identifying PC card 41 according to the fourth embodiment of the present invention. The PC card 41 consists of a card unit 13 and a scan unit 15 that are independent of each other and are connected with each other so that they may swing with respect to each other. When the PC card 41 is inserted into a card slot of a notebook PC 11, the scan unit 15 is inclined as shown in FIG. 13. As a result, a finger set on the scan unit 15 is oriented in a diagonal downward direction. This posture may be suitable for the finger.

Figure 14:
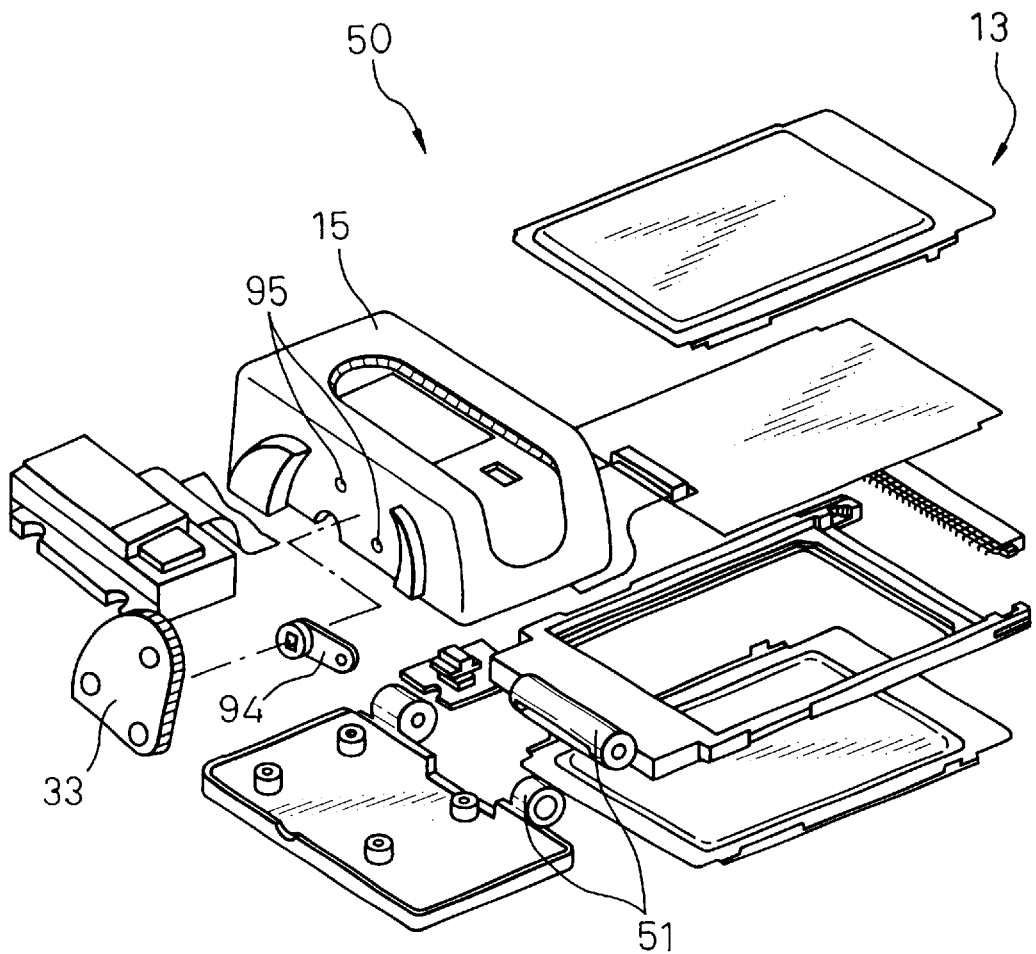
FIG. 14 is a perspective view showing a PC card according to a fifth embodiment of the present invention.
Figure 15:
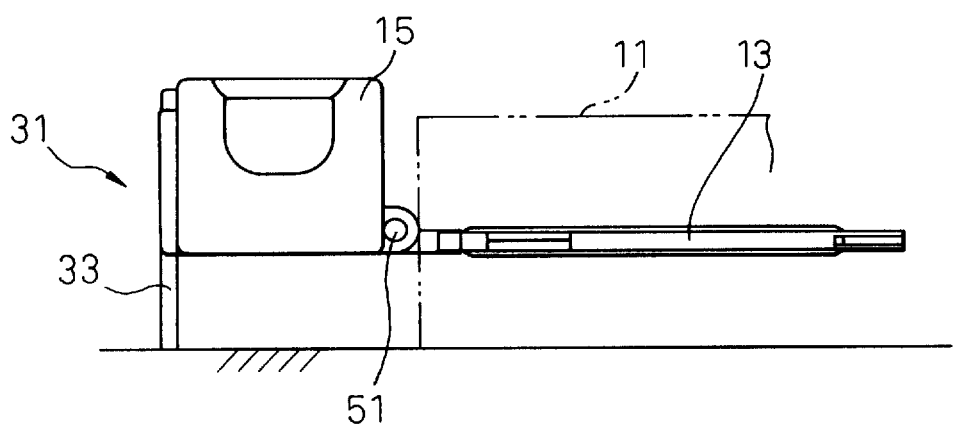
FIG. 15 is a side view showing the PC card of FIG. 14 seen from the front of a notebook PC into which the PC card is inserted.

FIGS. 14 and 15 show a fingerprint identifying PC card 50 according to the fifth embodiment of the present invention. This embodiment is a combination of the third embodiment of FIGS. 9 to 11 and the fourth embodiment of FIGS. 12 and 13. Namely, the PC card 50 consists of a card unit 13 and a scan unit 15 that are separate parts and are pivotably connected with each other through a joint 51. A height adjustable leg 31 is attached to a side face of the scan unit 15.

This structure perfectly secures the stability of the scan unit 15 to prevent excessive force from being applied to the PC card 50.

Figure 16:
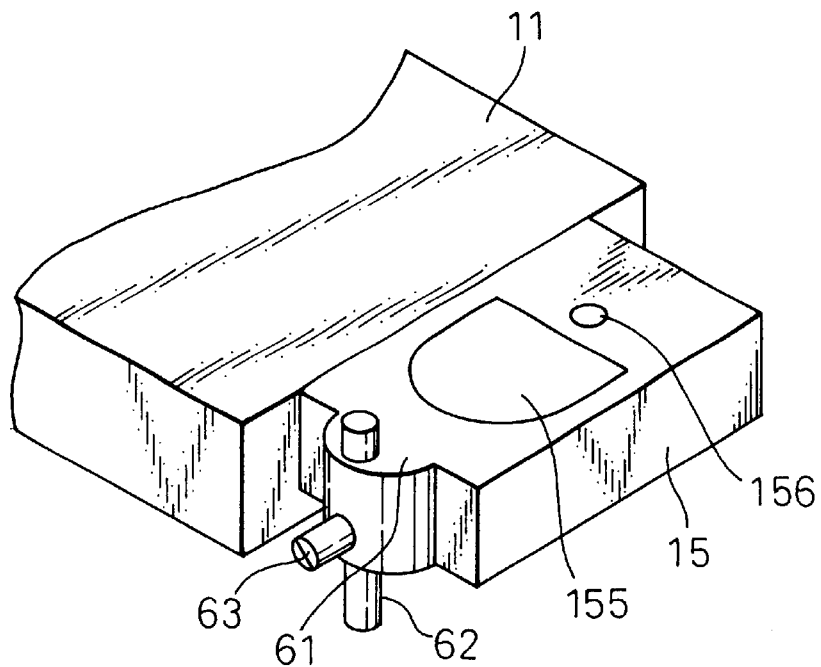
FIG. 16 is a perspective view showing a PC card according to a sixth embodiment of the present invention.

FIG. 16 shows a fingerprint identifying PC card according to the sixth embodiment of the present invention. The PC card 60 is in a slot of a notebook PC 11. In this situation, a scan unit 15 is in contact with a side face of the PC 11.

An upper end of the scan unit 15 has a projection 61, which has a through hole. The through hole receives a supporting rod 62 whose bottom is adjusted to a surface on which the PC 11 is placed. A screw 63 is horizontally inserted into the projection 61, to fix the rod 62.

The rod 62 transmits most of downward force applied to the PC card 60 by a finger to a desk, thereby preventing a breakage of the PC card 60.

Figure 17:
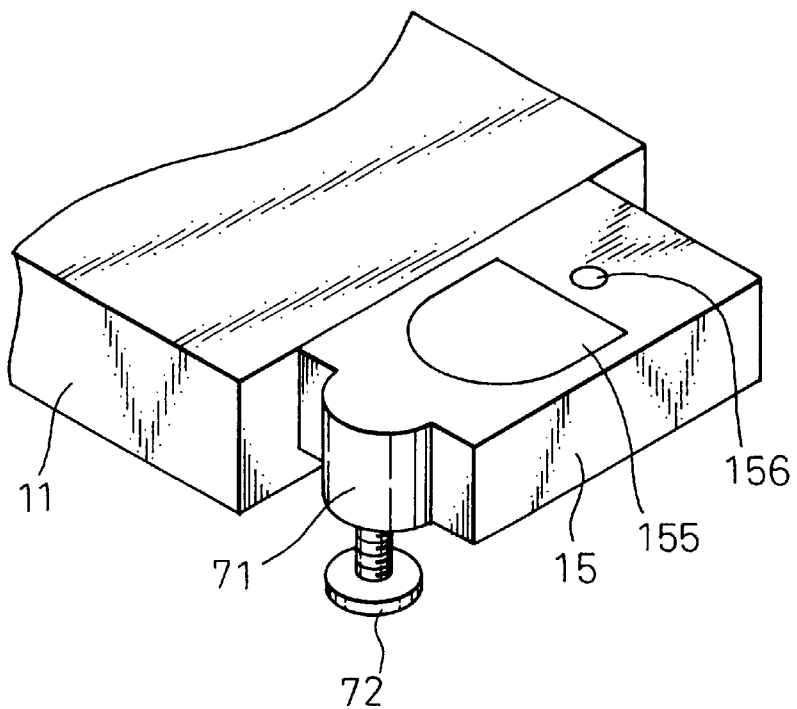
FIG. 17 is a perspective view showing a PC card according to a seventh embodiment of the present invention.

FIG. 17 shows a fingerprint identifying PC card according to the seventh embodiment of the present invention. A scan unit 15 has a projection 71 having a through hole. The through hole is threaded and a bolt 72 is screwed into the threaded hole from the bottom of the projection 71.

The bolt 72 transmits most of downward force applied to the PC card by a finger to a desk, thereby preventing a breakage of the PC card.

Figure 18:
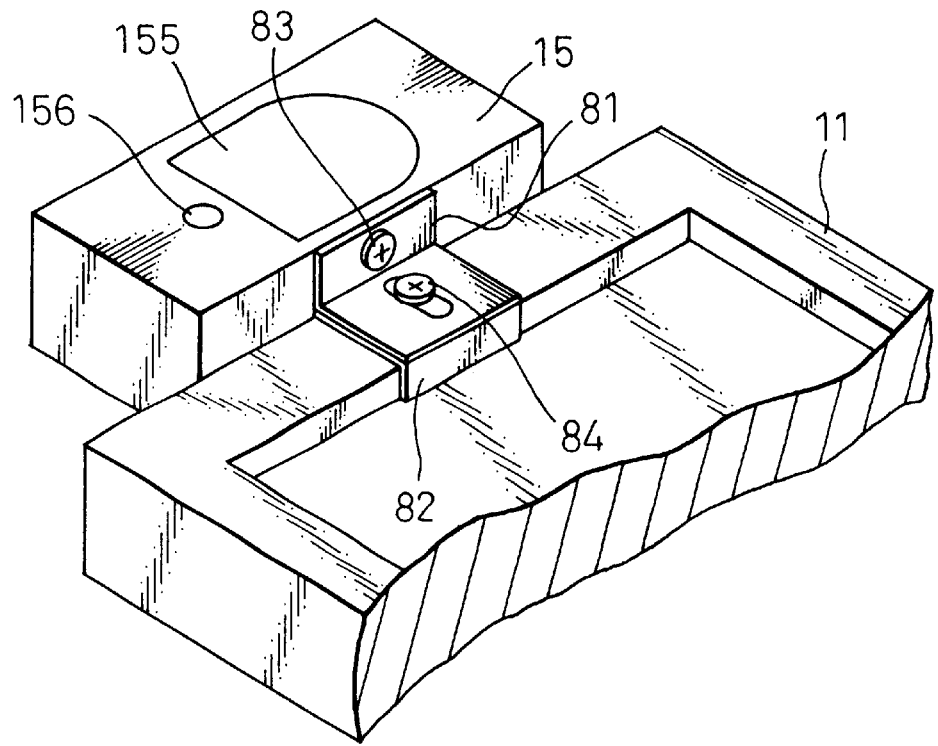
FIG. 18 is a perspective view showing a PC card according to an eighth embodiment of the present invention.

FIG. 18 shows a fingerprint identifying PC card according to the eighth embodiment of the present invention. The PC card is in a slot of a notebook PC 11. A scan unit 15 of the PC card is fixed to an edge of a keyboard of the PC 11 with L-shaped fittings 81 and 82.

A short segment of the first fitting 81 is fixed to the scan unit 15 with a bolt 83, and a short segment of the second fitting 82 is hooked to the edge of the keyboard of the PC 11. A long segment having an oblong hole of the fitting 81 and a long segment having an oblong hole of the fitting 82 are overlaid on each another and are fixed together with a bolt 84.

The fittings 81 and 82 transmit most of downward force to the PC 11 to avoid a breakage of the PC card.

Figure 19:
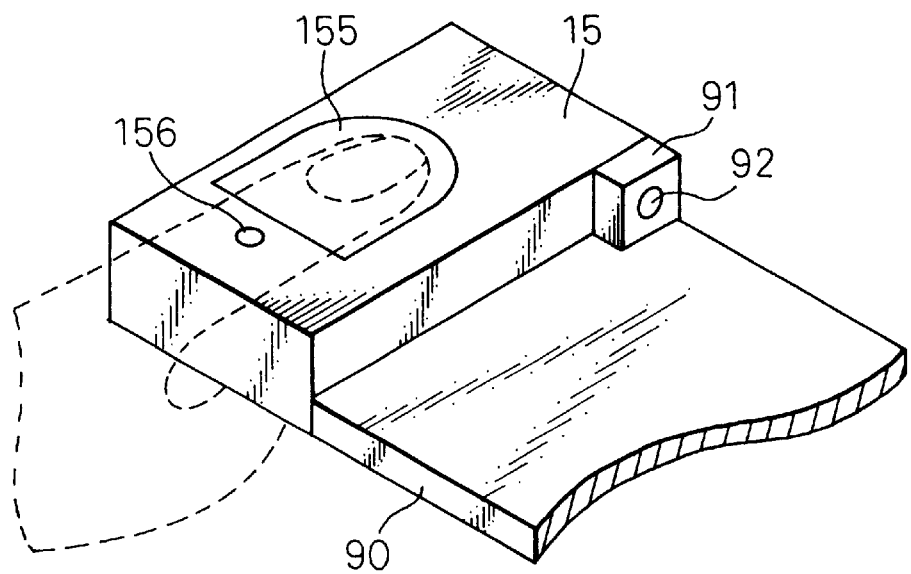
FIG. 19 is a perspective view showing a PC card according to a ninth embodiment of the present invention.

FIG. 19 shows a fingerprint identifying PC card according to the ninth embodiment of the present invention. A corner of a card unit 90 of the PC card has a support 91 provided with a horizontal rotary shaft 92. The shaft 92 is connected with a scan unit 15 so that the scan unit 15 may turn around the shaft 92.

The scan unit 15 has a top opening 155 and a small opening 156 on both of which an index finger is set. At this time, a thumb supports the bottom of the scan unit 15.

Since the thumb supports the bottom of the scan unit 15 while identifying a fingerprint, the pressing force of the index finger does not break the card unit 90.

Figure 20:
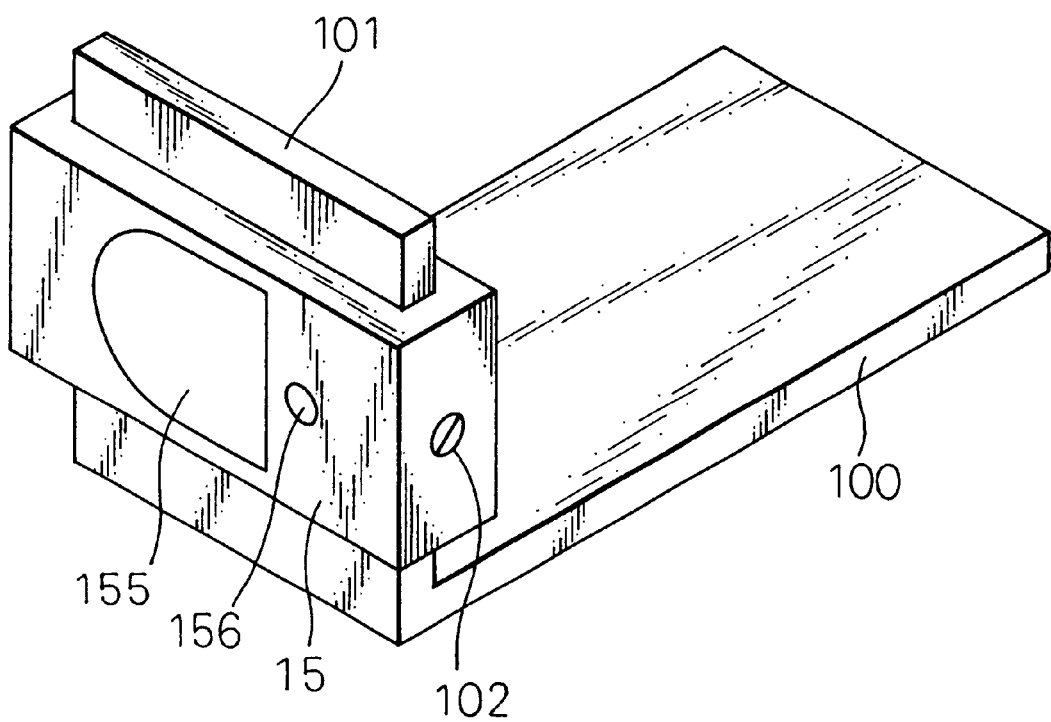
FIG. 20 is a perspective view showing a PC card according to a tenth embodiment of the present invention.

FIG. 20 shows a fingerprint identifying PC card according to the tenth embodiment of the present invention. A card unit 100 of the PC card has a vertical slide plate 101.

A scan unit 15 has a through hole to receive the plate 101 so that the scan unit 15 may vertically move along the plate 101 and is fixed at a proper position with a screw 102.

Since the pressing force of a finger acts in a direction so that the PC card is inserted into a notebook PC, the card unit 100 will not be broken.

The embodiments mentioned above assume that a notebook PC has a card slot on the left side thereof. In practice, the card slot may be formed on the right side.

If a PC card that is designed to be inserted into the left side of a notebook PC is inserted into the right side of the PC, a relationship between the scan unit of the PC card and a finger will be reversed.

To solve this problem, the present invention provides fingerprint identifying PC cards that can be used without regard to insertion directions.

Figure 21:
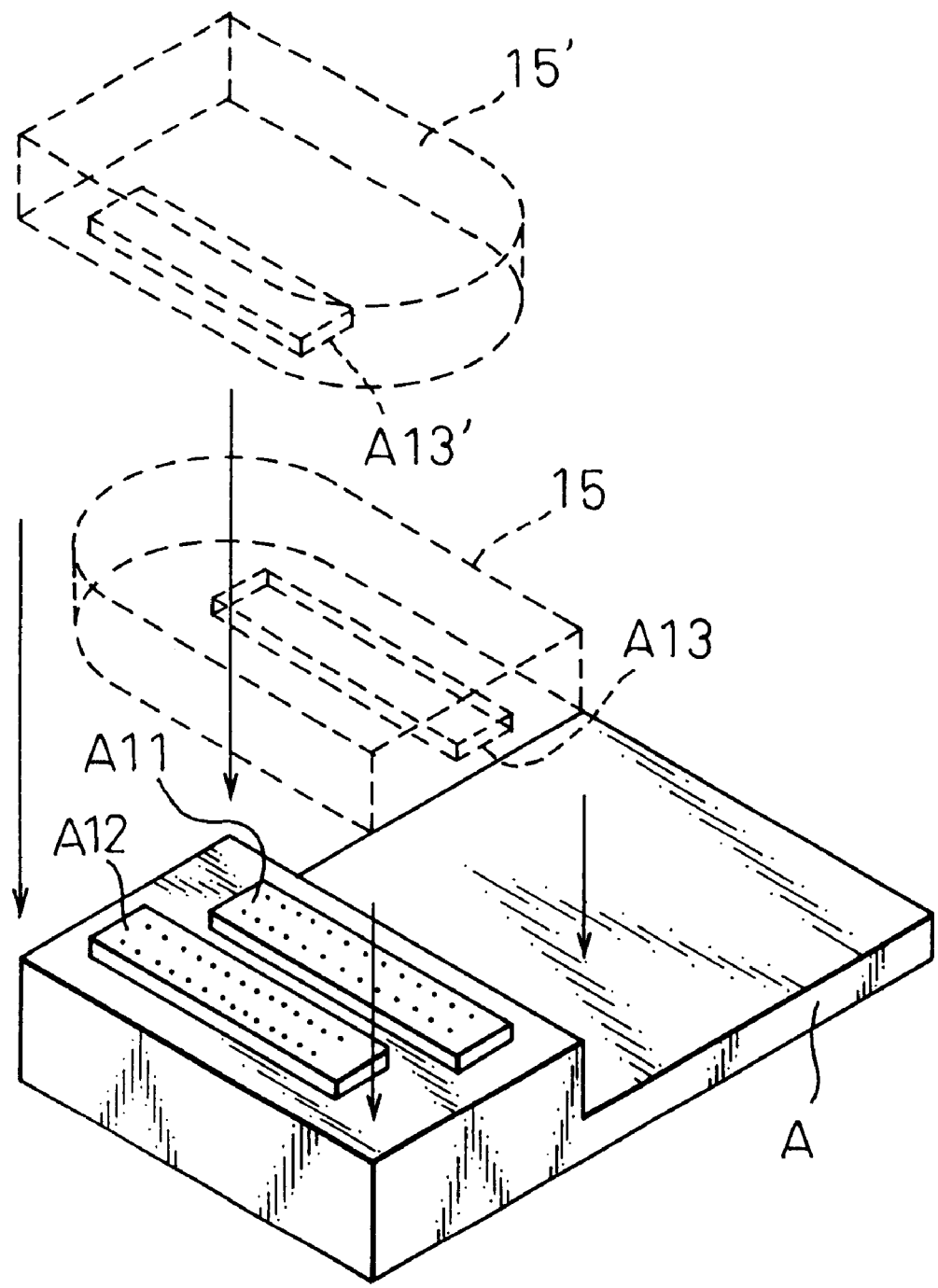
FIG. 21 is a perspective view showing a PC card according to an eleventh embodiment of the present invention.

FIG. 21 shows a fingerprint identifying PC card according to the eleventh embodiment of the present invention. The PC card has a card unit A having two receptacles A11 and A12 thereon. The receptacles A11 and A12 are point-symmetrical.

The bottom of a scan unit 15 of the card unit A has an insert A13 that is offset from the center of the bottom.

When the PC card is inserted into the left side of a PC, the scan unit 15 is attached to the card unit A by engaging the insert A13 with the receptacle A11.

If the PC card is inserted into the right side of a PC, the scan unit 15 is turned by 180 degrees into a scan unit 15', which is attached to the card unit A by engaging the insert A13' with the receptacle A12.

In this embodiment, the receptacles and the insert are replaceable.

Alternatively, the card unit A may have one receptacle or insert, and the scan unit 15 may have two inserts or receptacles.

Figure 22:
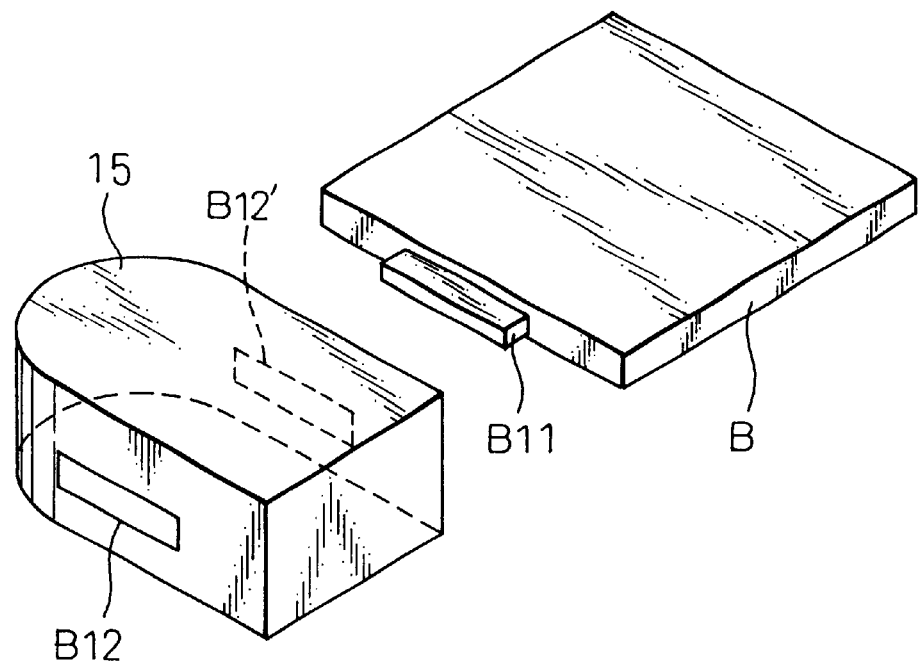
FIG. 22 is a perspective view showing a PC card according to a twelfth embodiment of the present invention.

FIG. 22 shows a fingerprint identifying PC card according to the twelfth embodiment of the present invention. A side end of a card unit B of the PC card has an insert B11 to be engaged with a scan unit 15.

Both side faces of the scan unit 15 have receptacles B12 and B12', respectively, to receive the insert B11.

The insert B11 is engaged with the receptacle B12 when the PC card is inserted into the left side of a notebook PC.

The insert B11 is engaged with the receptacle B12' when the PC card is inserted into the right side of a notebook PC.

Figure 23:
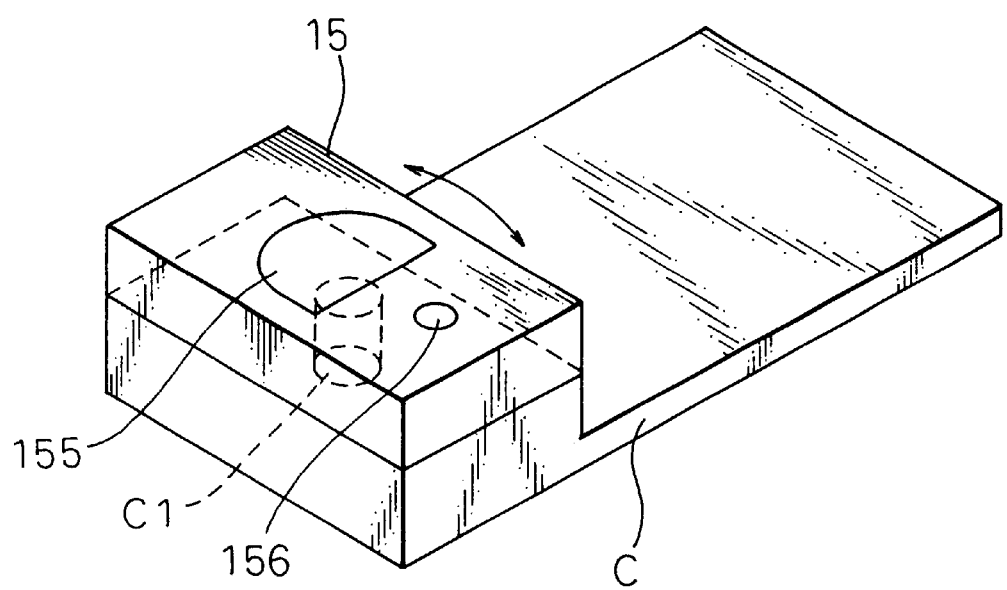
FIG. 23 is a perspective view showing a PC card according to a thirteenth embodiment of the present invention.

FIG. 23 shows a fingerprint identifying PC card according to the thirteenth embodiment of the present invention. The PC card has a card unit C having a shaft C1, and a scan unit 15 rotatably attached to the shaft C1.

It is preferable to provide a mechanism to restrict the rotating range of the scan unit 15 within 180 degrees to prevent a breakage of a cable that connects the card unit C to the scan unit 15.

The scan unit 15 is turned by 180 degrees on the card unit C so that the PC card may be inserted into either of the left and right sides of a notebook PC.

Figure 24:
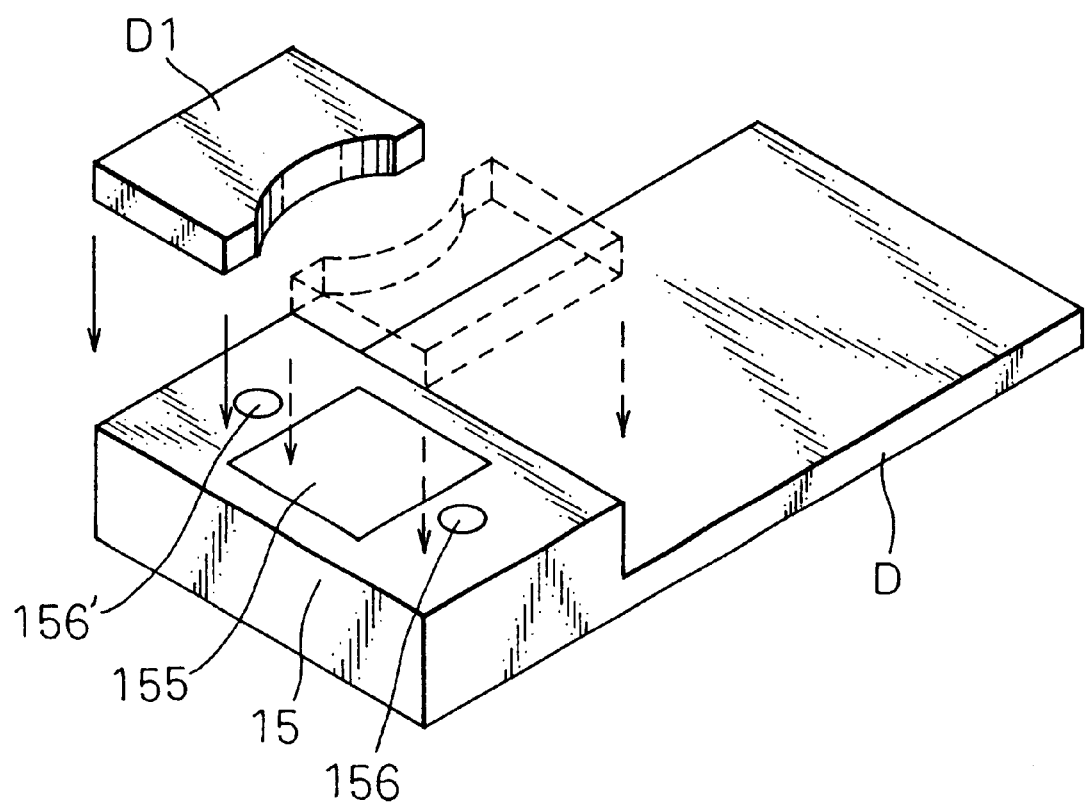
FIG. 24 is a perspective view showing a PC card according to a fourteenth embodiment of the present invention.

FIG. 24 shows a fingerprint identifying PC card according to the fourteenth embodiment of the present invention. A scan unit 15 of the PC card has a rectangular center opening 155 and small openings 156 and 156' that are symmetrical with respect to the center opening 155. A finger cover C1 is used to cover one of the small openings 156 and 156'.

When the PC card is inserted into the left side of a notebook PC, the cover C1 covers the small opening 156', and when the PC card is inserted into the right side of a PC, the cover C1 covers the small opening 156.

According to the fourteenth embodiment, a relationship between a finger and a scanner (not shown) arranged under the center opening 155 is reversed when the PC card is inserted into the opposite side of a PC. In this case, normal and reverse fingerprint patterns must be stored in the PC card. This requires the large amount of a memory of the PC card and elongates a fingerprint scanning time.

Figure 25:
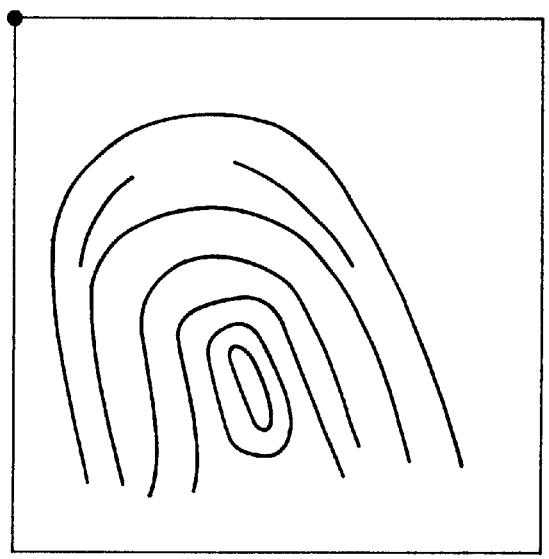
FIG. 25 is view showing fingerprint images taken by a scanner.
Figure 25:
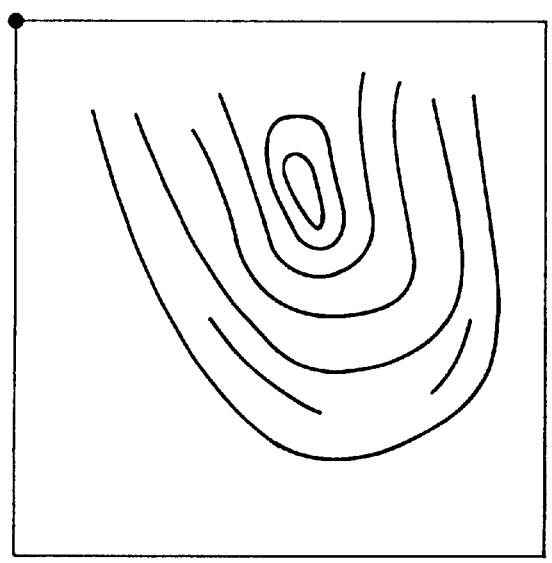

FIG. 25 shows fingerprint images provided by the scanner. The image (A) is acquired when the PC card is inserted into the left side of a PC, and the image (B) is acquired when the PC card is inserted into the right side thereof.

When these images are scanned from the upper left corner toward the lower right corner, the scanned data stored in a memory of the PC represents the images (A) and (B) that are upside-down and left-right reversed.

Figure 26:
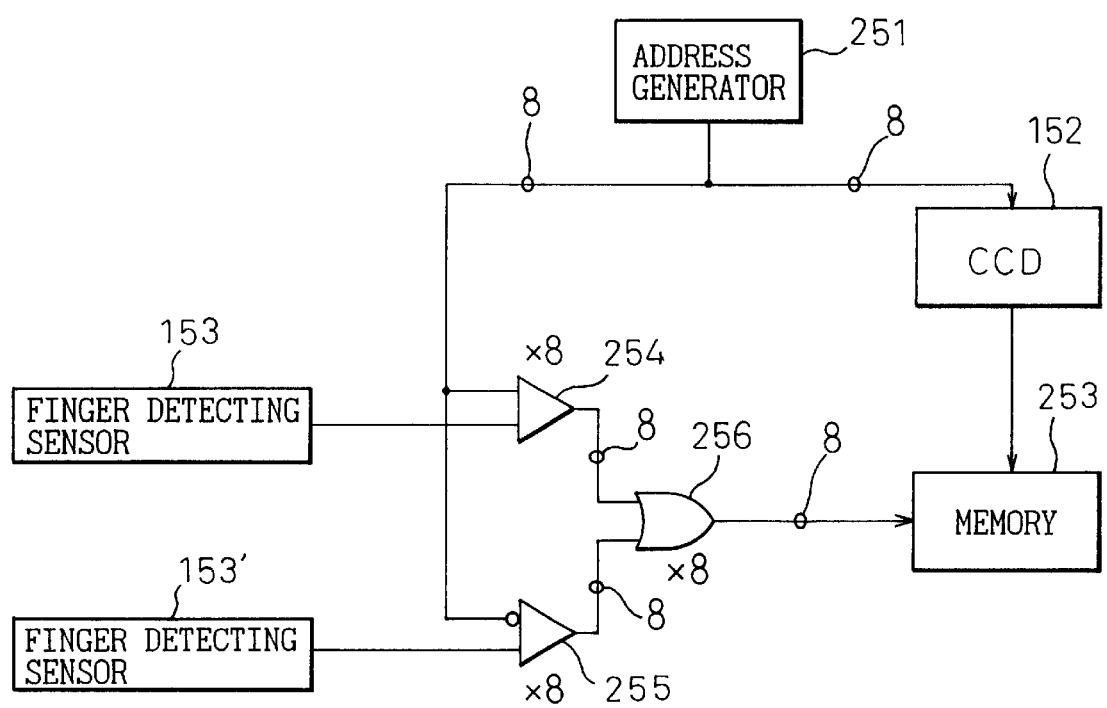
FIG. 26 is a block diagram showing a correction circuit according to another embodiment of the present invention.

FIG. 26 shows a correction circuit according to the present invention to solve the above-mentioned problem. An address generator 251 provides an address to the scanner 152 under the center opening 155, a first AND gate group 254, and a second AND gate group 255.

The address is directly supplied to an input terminal of the AND gate group 254. At the same time, the address is inverted and supplied to an input terminal of the AND gate group 255. The number of gates in each gate group corresponds to the number of bits of the address.

The other input terminal of the AND gate group 254 is connected to a finger sensor 153 under the small opening 156, and the other input terminal of the AND gate group 255 is connected to a finger sensor 153' under the small opening 156'.

The outputs of the AND gate groups 254 and 255 are connected to an address terminal of a memory 253 through an OR gate group 256.

If the finger sensor 153 detects a finger, i.e., if the PC card is inserted into the left side of a PC, the output of the scanner 152 is stored as it is in the memory 253. If the finger sensor 153! detects a finger, i.e., if the PC card is inserted into the right side of a PC, the output of the scanner 152 is inverted and stored in the memory 253.

This correction circuit eliminates inverted reference fingerprint patterns being stored in the memory 253, thereby reducing the amount of the memory required and shortening a fingerprint identifying time.

Figure 27:
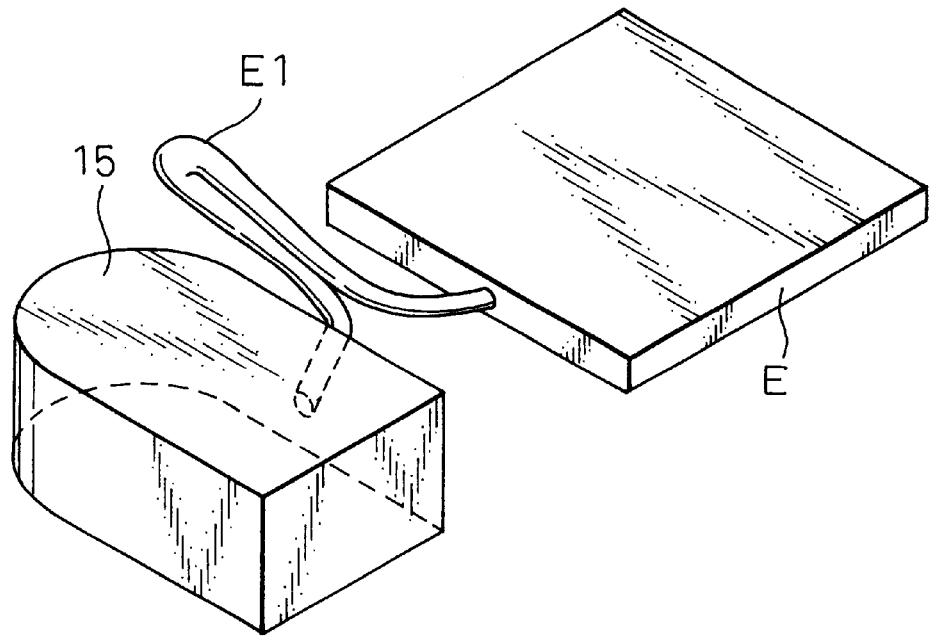
FIG. 27 is a perspective view showing a PC card according to a fifteenth embodiment of the present invention.

FIG. 27 is a perspective view of the fifteenth embodiment of the present invention, and a PC card E and a scanner 15 are connected with a cable E1.

Therefore, the scanner 15 can be arranged at either side of the PC regardless of the side where the PC card E is inserted.

Figure 28:
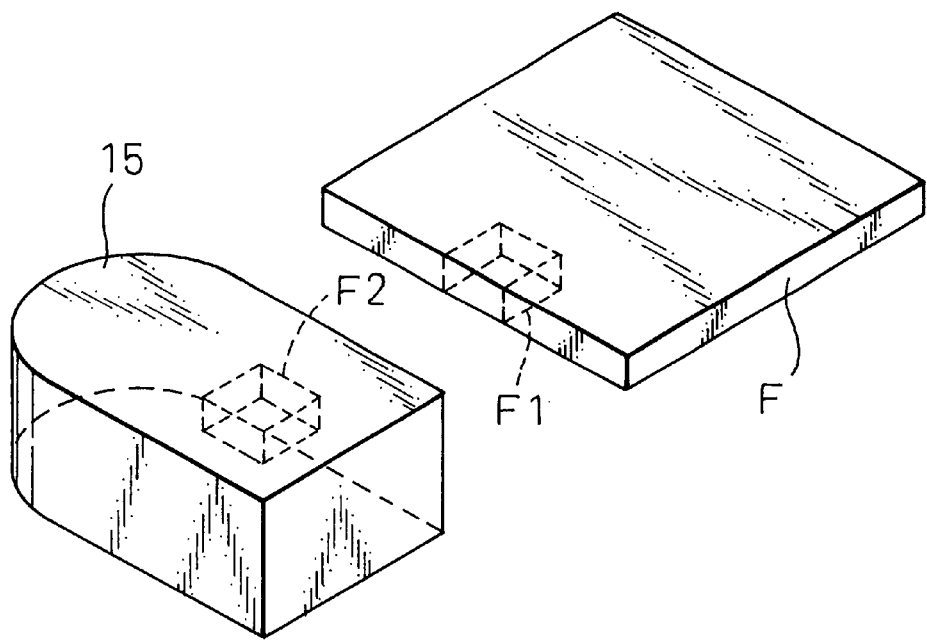
FIG. 28 is a perspective view showing a PC card according to a sixteenth embodiment of the present invention.

FIG. 28 is a perspective view of the sixteenth embodiment of the present invention, and a PC card F provides a wireless receiver and a scanner provide a wireless transmitter.

Therefore, the scanner 15 can be arranged at either side of the PC regardless of the side where the PC card F is inserted, because the data detected by the scanner is transmitted to the PC card F by wireless.

Note, in the fifteenth and sixteenth embodiments, the PC card and the scanner may be connected to each other by any relevant connecting part.

What is claimed is:

1. A PC card to be removably inserted into a card slot of a portable information apparatus, comprising:

a card unit;

a scanner for fingerprint identification installed on said card unit; and a supporting part to support the scan unit, to reduce a force transferred to the card unit when a finger is set on the scan unit, the supporting part being a mechanism to attach the scan unit to the card unit so that the scan unit turns in a circle orthogonal to the card unit so that a user can support the bottom of the scan unit with his or her thumb while identifying a fingerprint.

2. The PC card of claim 1, further comprising:

a finger sensor arranged at a front end of the scanner, for detecting the presence of a finger on the scanner.

3. A PC card to be removably inserted into a card slot of a portable information apparatus, comprising:

a card unit;

a scanner for fingerprint identification installed on said card unit;

a finger sensor arranged at a front end of the scanner, for detecting the presence of a finger on the scanner; and connection means for connecting the card unit and scan unit so that the finger sensor always exists at the front end of the scanner whether the card unit is inserted into the left or right side of the portable information apparatus.

4. The PC card of claim 3, wherein the connection means consists of:

a first connection terminal arranged on the card unit and having at least one connection port;

a second connection terminal arranged on the card unit and having at least one connection port that is point-symmetrical with respect to the connection port of the first connection terminal; and a third connection terminal arranged on the bottom of the scan unit and connected to the first connection terminal when the card unit is inserted into the left side of the portable information apparatus and to the second connection terminal when the card unit is inserted into the right side of the portable information apparatus.

5. The PC card of claim 3, wherein the connection means consists of:

a third connection terminal arranged on the card unit and having at least a connection port;

a first connection terminal arranged on the bottom of the scan unit and having at least a connection port that is connected to the third connection terminal when the card unit is inserted into the left side of the portable information apparatus; and a second connection terminal arranged on the bottom of the scan unit and having at least a connection port that is point-symmetrical with respect to the connection port of the first connection terminal and is connected to the third connection terminal when the card unit is inserted into the right side of the portable information apparatus.

6. The PC card of claim 3, wherein the connection means consists of:

a third connection terminal arranged at a first end of the card unit;

a first connection terminal arranged on a first side face of the scan unit and connected to the third connection terminal when the card unit is inserted into a first side face of the portable information apparatus, and a second connection terminal arranged on a second side face of the scan unit and connected to the third connection terminal when the card unit is inserted into a second side face of the portable information apparatus.

7. The PC card of claim 3, wherein the connection means consists of:

a rotary shaft for rotatably fitting the scan unit to the card unit.

8. The PC card of claim 3, wherein the connection means consists of:

a cable which connects the PC card and the scan unit.

9. The PC card of claim 3, wherein the connection means consists of:

a wireless receiver arranged on the PC card, and a wireless transmitter arranged on the scan unit.

10. A PC card to be removably inserted into a card slot of a portable information apparatus, comprising:

a card unit;

a scan unit comprising a scanner for fingerprint identification; and a supporting part to support the scan unit, and to reduce a force transferred to the card unit when a finger is set on the scan unit, wherein the supporting part is a mechanism to attach the scan unit to the card unit so that the scan unit turns in a circle orthogonal to the card unit so that a user can support the bottom of the scan unit with his or her thumb while identifying a fingerprint.

11. The PC card of claim 10, further comprising a finger sensor arranged at a front end of the scanner, to detect the presence of a finger on the scanner.

12. A PC card to be removably inserted into a card slot of a portable information apparatus, comprising:
- a card unit;
- a scan unit comprising a scanner for fingerprint identification;
- a finger sensor arranged at a front end of the scanner, to detect the presence of a finger on the scanner; and
- connection means to connect the card unit and scan unit so that the finger sensor always exists at the front end of the scanner whether the card unit is inserted into the left or right side of the portable information apparatus, wherein the connection means comprises:
- a first connection terminal arranged on the card unit and having a connection port;
- a second connection terminal arranged on the card unit and having a connection port that is point-symmetrical with respect to the connection port of the first connection terminal; and
- a third connection terminal arranged on the bottom of the scan unit and connected to the first connection terminal when the card unit is inserted into the left side of the portable information apparatus and to the second connection terminal when the card unit is inserted into the right side of the portable information apparatus.

13. A PC card to be removably inserted into a card slot of a portable information apparatus, comprising:
- a card unit;
- a scan unit comprising a scanner for fingerprint identification;
- a finger sensor arranged at a front end of the scanner, to detect the presence of a finger on the scanner; and
- connection means to connect the card unit and scan unit so that the finger sensor always exists at the front end of the scanner whether the card unit is inserted into the left or right side of the portable information apparatus, wherein the connection means comprises:
- a third connection terminal arranged on the card unit and having a connection port;
- a first connection terminal arranged on the bottom of the scan unit and having a connection port that is connected to the third connection terminal when the card unit is inserted into the left side of the portable information apparatus; and
- a second connection terminal arranged on the bottom of the scan unit and having a connection port that is point-symmetrical with respect to the connection port of the first connection terminal and is connected to the third connection terminal when the card unit is inserted into the right side of the portable information apparatus.

14. A PC card to be removably inserted into a card slot of a portable information apparatus, comprising:
- a card unit;
- a scan unit comprising a scanner for fingerprint identification;
- a finger sensor arranged at a front end of the scanner, to detect the presence of a finger on the scanner; and
- connection means to connect the card unit and scan unit so that the finger sensor always exists at the front end of the scanner whether the card unit is inserted into the left or right side of the portable information apparatus, wherein the connection means comprises:
- a third connection terminal arranged at a first end of the card unit;
- a first connection terminal arranged on a first side face of the scan unit and connected to the third connection terminal when the card unit is inserted into a first side face of the portable information apparatus; and
- a second connection terminal arranged on a second side face of the scan unit and connected to the third connection terminal when the card unit is inserted into a second side face of the portable information apparatus.

* * * * *